US 6,738,909 B1

(12) United States Patent
Cheng et al.

(10) Patent No.: US 6,738,909 B1
(45) Date of Patent: May 18, 2004

(54) METHOD AND APPARATUS FOR AUTOMATIC CONFIGURATION FOR INTERNET PROTOCOL SECURITY TUNNELS IN A DISTRIBUTED DATA PROCESSING SYSTEM

(75) Inventors: Pau-Chen Cheng, Yorktown Heights, NY (US); William Alton Fiveash, Austin, TX (US); Vachaspathi Peter Kompella, Cary, NC (US); Christiaan Blake Wenzel, Austin, TX (US); Jacqueline Hegedus Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,199

(22) Filed: Sep. 2, 1999

(51) Int. Cl.[7] .................................................. H04L 9/32
(52) U.S. Cl. ........................................ 713/201; 709/223
(58) Field of Search .......................... 713/153; 709/229, 709/223; 707/10

(56) References Cited

U.S. PATENT DOCUMENTS 5,835,726 A * 11/1998 Shwed et al. ............... 709/229
5,898,784 A * 4/1999 Kirby et al. ................. 713/153
6,330,562 B1 * 12/2001 Boden et al. ................. 707/10
6,643,776 B1 * 11/2003 Boden et al. ............... 713/200

OTHER PUBLICATIONS

"Configuring Accept Policies", Bay Networks Apr. 16, 1996, 2 pages. (http://www.ifb.com.pl/~mateo/bgp/ip/2917A–260.html).*

"AIX IP Security", AIXpert Magazine, Mar. 1998, 8 pages. (http://www–1.ibm.com/servers/aix/products/ibmsw/security/vpn/techref/m98chang.pdf).*

* cited by examiner

Primary Examiner—Ly V. Hua
Assistant Examiner—Ronald Baum
(74) Attorney, Agent, or Firm—Duke W. Yee; Volel Emile; Stephen J. Walder, Jr.

(57) ABSTRACT

A method and apparatus for use in data processing system for selecting rules to filter data for a tunnel. A request is received to create a tunnel to another data processing system. A granularity of information about the data processing system is identified to form an identified granularity. The identified granularity of the information about the data processing system is used to select a rule, which matches the identified granularity. This rule is placed in a filter, wherein the filter associates data packets with the tunnel.

27 Claims, 7 Drawing Sheets

| SOURCE ADDRESS | DESTINATION ADDRESS | DIRECTION | PROTOCOL | PORT | TUNNEL NUMBER | ACTION |
|---|---|---|---|---|---|---|
| ANY | ANY | IN AND OUT | UDP | 500 | NONE | PERMIT |
| ANY | ANY | IN AND OUT | ESP | ANY | NONE | PERMIT |
| ANY | ANY | IN AND OUT | AH | ANY | NONE | PERMIT |

FIG. 7

| SOURCE ADDRESS | DESTINATION ADDRESS | DIRECTION | PROTOCOL | PORT | TUNNEL NUMBER | ACTION |
|---|---|---|---|---|---|---|
| HOST 1 | HOST 2 | OUTBOUND | ICMP | ANY | 1 | PERMIT |
| HOST 2 | HOST 1 | INBOUND | ICMP | ANY | 1 | PERMIT |
| HOST 3 | HOST 4 | INBOUND | ANY | ANY | 2 | PERMIT |
| HOST 4 | HOST 3 | OUTBOUND | ANY | ANY | 2 | PERMIT |
| SUBNET 1 | SUBNET 2 | OUTBOUND | ANY | ANY | 3 | PERMIT |
| SUBNET 2 | SUBNET 1 | INBOUND | ANY | ANY | 3 | PERMIT |

METHOD AND APPARATUS FOR AUTOMATIC CONFIGURATION FOR INTERNET PROTOCOL SECURITY TUNNELS IN A DISTRIBUTED DATA PROCESSING SYSTEM

BACKGROUND OF THE INVENTION

1. Technical Field

The present invention relates generally to an improved distributed data processing system and in particular to a method and apparatus for establishing connections between nodes in a distributed data processing system. Still more particularly, the present invention relates to a method and apparatus for automatically configuring secure connections between nodes in a distributed data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML).

Often times, it is desirable to set up a secure communications channel for all data transmitted between different computers. This cannot be achieved with a mechanism like a secure that is used in a browser. Thus an alternate technology called IP security is used to set up a secure tunnel. This secure communications channel is also referred to as a "tunnel" or "security tunnel". In order to setup secure communications between machines, a variety of security parameters are negotiated, then the characteristics of the IP stack are altered to use those negotiated parameters. In setting up a tunnel, different rules are used to specify how data is to be handled. Presently, these rules are typically placed in a filter table, which is used to identify how data is to be treated in a tunnel. These rules must be ordered from more general to more specific. For example, a rule used for hosts is more specific than rules for subnets. Therefore, a rule for hosts should be placed before a rule for subnets in a filter table.

Presently, users must create and order the security rules for each tunnel. Such a process is time consuming and tedious. Further, having users create and order security rules for each tunnel also is error prone. Therefore, it would be advantageous to have an improved method and apparatus for configuring tunnels.

SUMMARY OF THE INVENTION

The present invention provides a method and apparatus for use in a data processing system for automatically creating and ordering rules without user intervention rules to map data for a tunnel. A request is received to create a tunnel to another data processing system. A granularity of information about the data processing system is identified to form an identified granularity. The identified granularity of the information about the data processing system is used to select a rule, which matches the identified granularity. This rule is placed in a filter, wherein the filter associates data packets with the tunnel.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
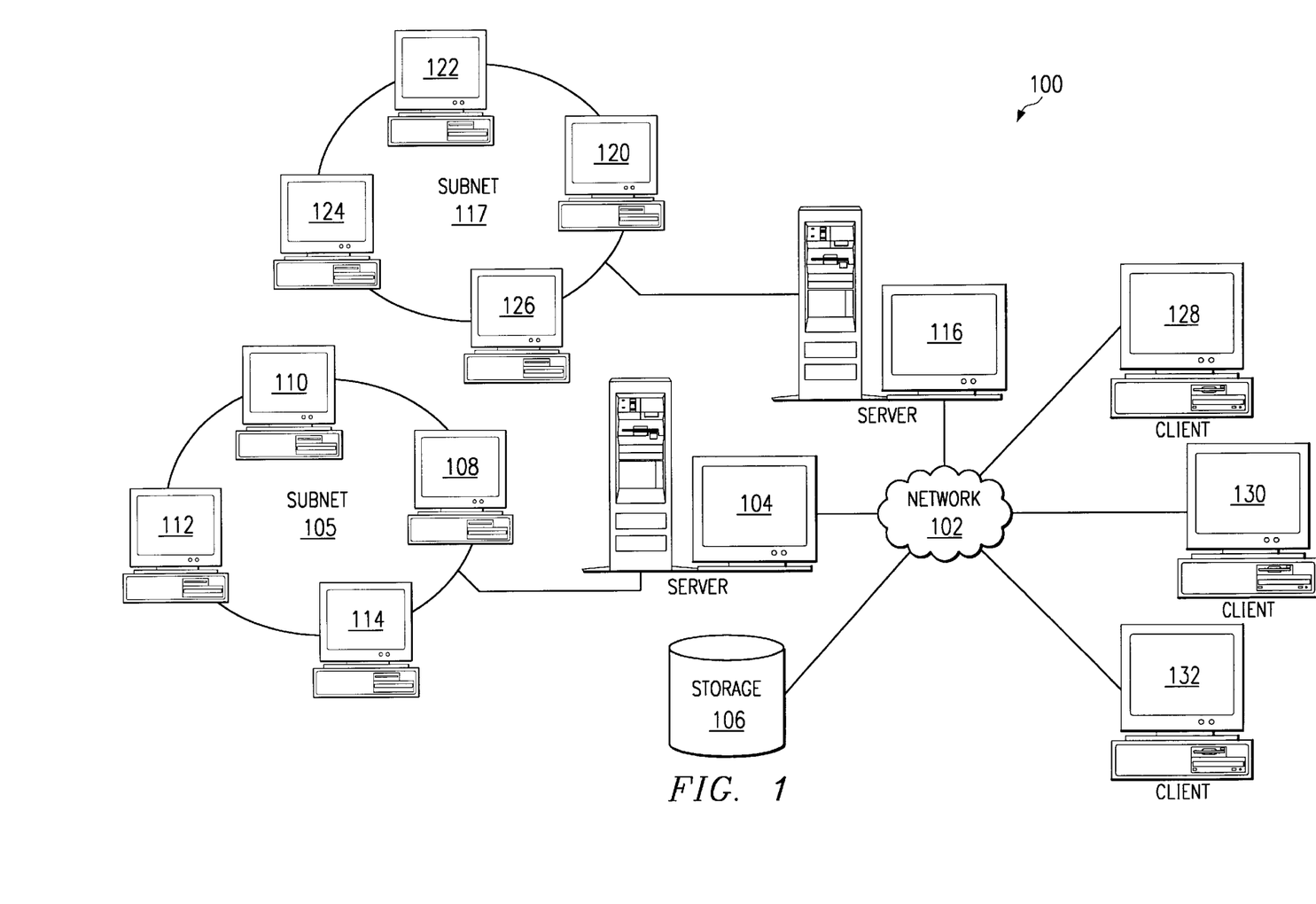
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104, such as a database server, is connected to network 102 along with storage unit 106. Server 104 is part of subnet 105, which contains computers 108–114. A server 116 is also connected to the network 102, which is part of subnet 117, containing computers 120–126. In addition, clients 128, 130, and 132 also are connected to a network 102. These clients 128, 130, and 132 may be, for example, personal computers or network computers. For purposes of this application, a network computer is any computer, coupled to a network, which receives a program or other application from another computer coupled to the network. In the depicted example, servers 104 and 116 provide data, such as boot files, operating system images, and applications to clients, such as clients 128–132. Distributed data processing system 100 may include additional servers, clients, and other devices not shown. These clients, servers, and other devices also are generally referred to as nodes.

Communications channels, such as tunnels, may be set up between different computers connected to the network 102, such as, for example, client 128 and client 130. A tunnel also may be set up between subnets, such as, for example, subnet 105 and subnet 117. Further, tunnels may be established between computers within a subnet, such as, for example, computer 110 and computer 114 in subnet 105

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
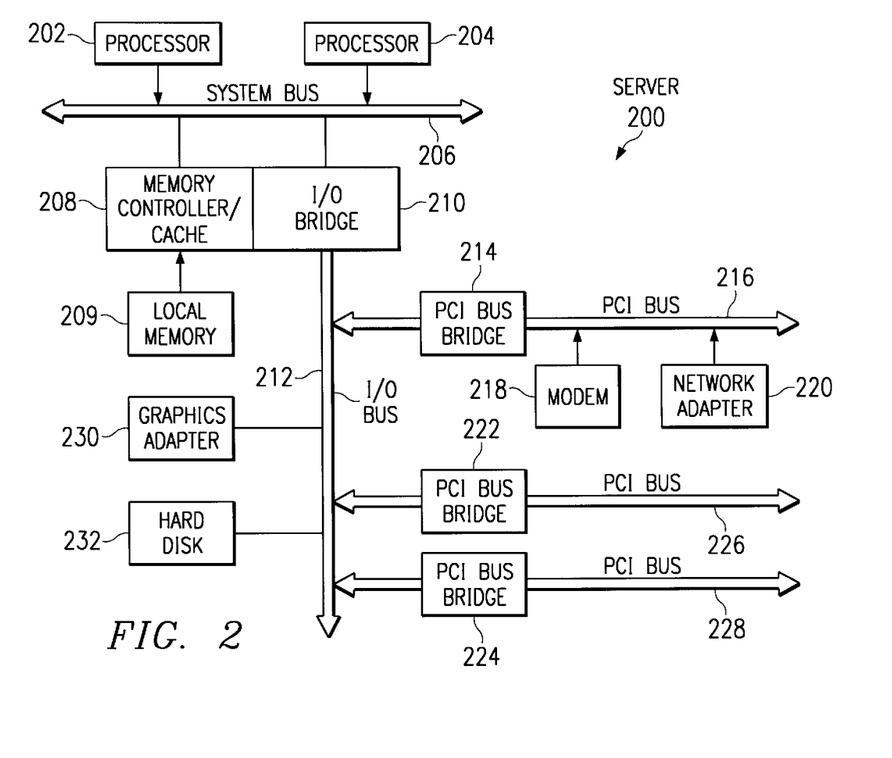
FIG. 2 is a block diagram that depicts a data processing system that may be implemented as a server in accordance with a preferred embodiment of the present invention.

Referring to FIG. 2, a block diagram that depicts a data processing system that may be implemented as a server, such as server 104 in FIG. 1, is illustrated in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
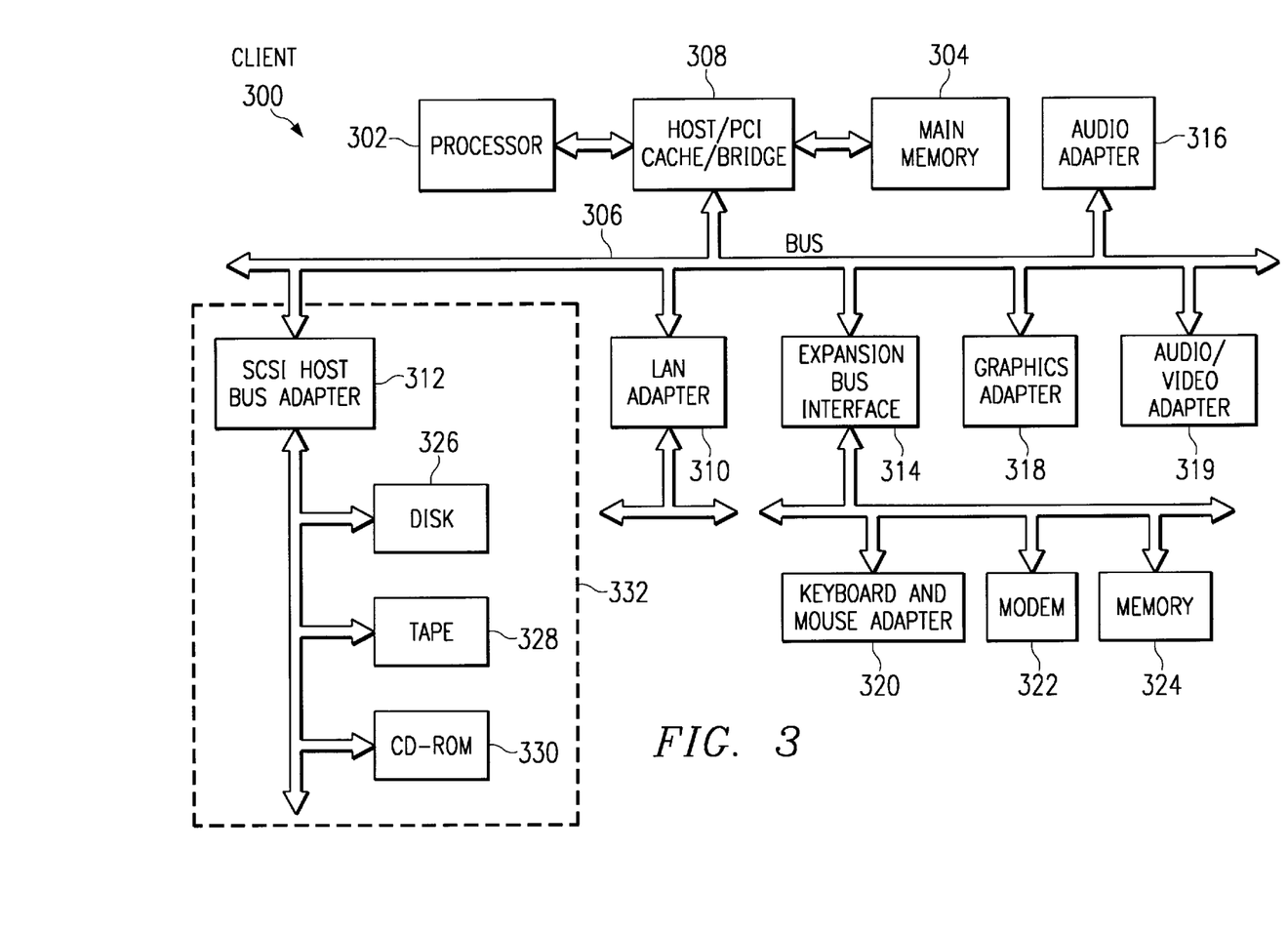
FIG. 3 is a block diagram that illustrates a data processing system in which the present invention may be implemented.

With reference now to FIG. 3, a block diagram that illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as AIX, which is available from International Business Machines Corporation. "AIX" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for automatically inserting the tunnel definitions to be used by the IP stack. Additionally, the mechanism of the present invention orders the definitions based on the granularity of the tunnels. Granularity defines how specific the information is that describes the data. For example, course granularity would cover all data while a fine granularity would be between two hosts using a specific protocol and port number. The granularity of the information defining the connection between two nodes indicates how specific traffic within the tunnel will be defined. For example, if a tunnel is between two hosts, the granularity for this tunnel is more specific than the granularity for a tunnel between two subnets. In such a case, the mechanism of the present invention identifies the rules for these two types of tunnels based on the information identified for the tunnels.

Additionally, the mechanism of the present invention will place the rules in the correct order. For example, the rules for the hosts will be put ahead of the rules for the subnets. Therefore, if the security policy between two hosts is different than the policy for the entire subnet, it can be specified with one tunnel definition, as opposed to having to split the subnet for the machines below and above the host to host tunnel. Similarly, a tunnel for a particular port/protocol combination between hosts will be ordered ahead of a tunnel for all traffic between those hosts. Therefore, the traffic will match the specific rule before being checked against the more general rule.

Figure 4:
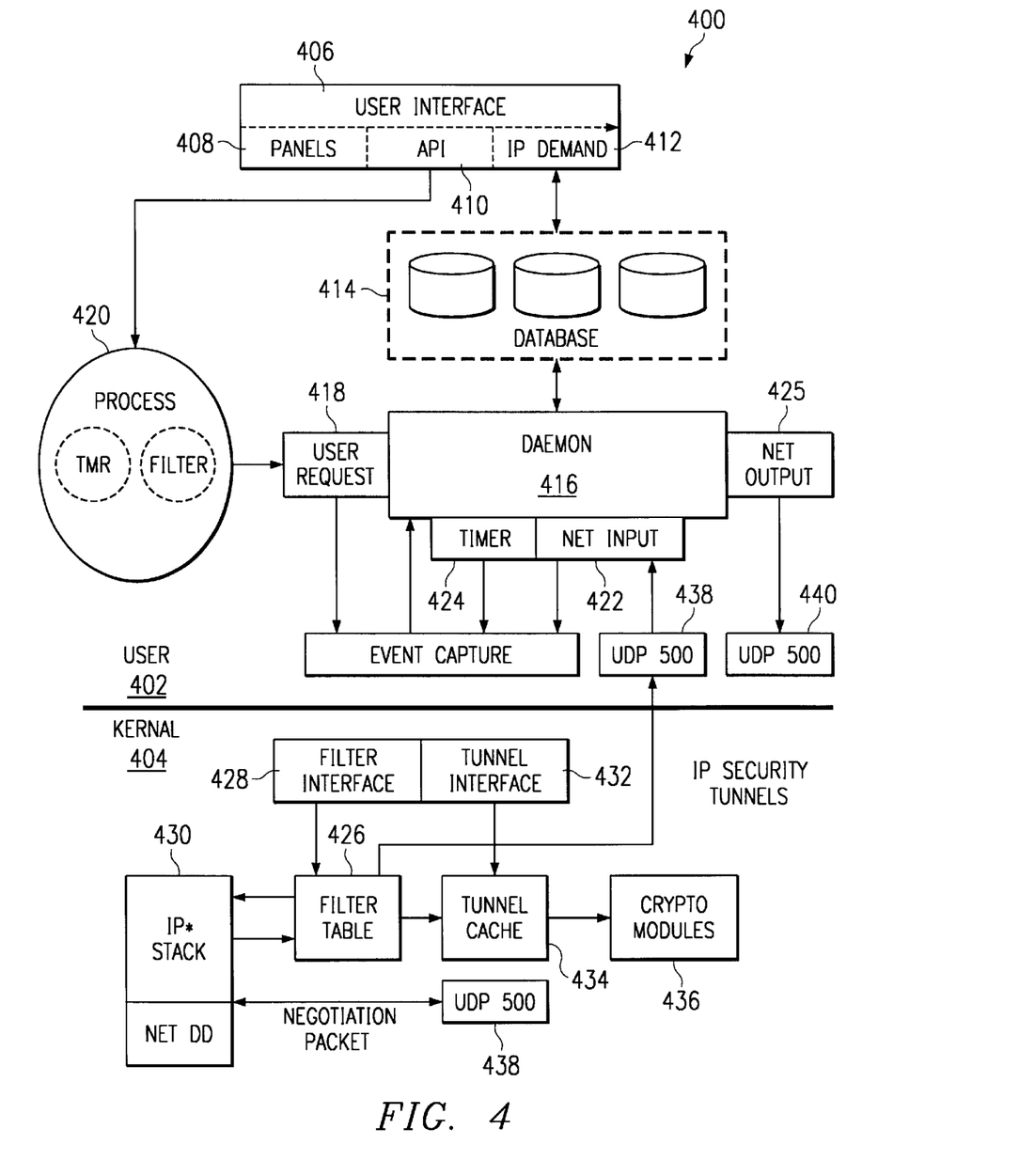
FIG. 4 is a block diagram illustrating software components used in automatically configuring Internet protocol (IP) security tunnels in accordance with a preferred embodiment of the present invention.

With reference now to FIG. 4, a block diagram illustrating software components used in automatically configuring Internet protocol (IP) security tunnels is depicted in accordance with a preferred embodiment of the present invention. Internet security architecture key management protocol (ISAKMP) function 400 includes a user portion 402 and a kernel portion 404. ISAKMP function 400 is available from International Business Machines Corporation. The processes of the present invention are implemented within ISAKMP function 400 in accordance with a preferred embodiment of the present invention.

ISAKMP function 400 may be used in Advanced Interactive Executive (AIX), which is available from International Business Machines Corporation and is an implementation of UNIX. The processes of the present invention may be implemented within ISAKMP function 400.

In IP Security, secure tunnels are created to protect data. Data can be protected for integrity, authenticity and confidentiality. Proof of Integrity and authenticity is provided by using authentication algorithms such as HMAC MD5 or HMAC SHA1 to authenticate IP packets. Confidentiality is provided by encrypting the data using encryption algorithms such as DES or Triple DES (3DES). The IP data is encapsulated using IP security headers known as authentication header (AH) or encapsulating security payload (ESP). The purpose of ISAKMP processing is to dynamically negotiate and generate the security association (SA) that will be used by the IP Security tunnels.

ISAKMP function 400 provides a mechanism for negotiating security parameters, generating and distributing keys. This function performs the key negotiation and produces security associations for phase 1 and phase 2. Phase 1 is a key management phase in which the channel is setup and the other side is authenticated for negotiating a tunnel and phase 2 is a data management phase in which parameters are passed for setting up handling data in the tunnel, such as the filter rules used for the tunnel.

Phase 1 SAs are used to encrypt the negotiation messages. Phase 2 SAs are the security parameters that are downloaded into the kernel for use during bulk data protections using AH or ESP.

User interface 406 in this example is a Java-based graphical user interface (GUI) front end for adding user interaction with various functions provided by ISKAMP function 400. In this example, user interface 406 includes user panels 408. These panels allow a user to specify security policy, proposal lists, access control mapping, and initiate a new tunnel. User interface 406 also includes an IP interface 410, which provides an interface to the commands to start/stop and list status of tunnels. Additionally, user interface 406 also includes IP demand interface 412, which provides an interface to database 414. Database 414 is used to define the relationships between the remote and local IDs and the security policy that will be used. For example database 414 may include information used to calculate the granularity or specificity of a tunnel. This information may include, for example, subnet identification of the target data processing system for the tunnel, protocols used to communicate with the target, and a port number used by the target.

Daemon 416 performs the key negotiation for phase 1 and phase 2 by either processing a user request 418 from management process 420, or acting as a responder upon receiving an ISAKMP message, such as a user data protocol (UDP) data packet from the network input 422 or a expiration of a timer in timer process 424. As a responder, responses are sent to the network through network output 425. Timer process 424 is a retransmission timer in this example. Daemon 416 plays a passive role, in that daemon 416 responds to requests. Daemon 416 is responsible for phase 1 SA's, and letting the management process 420 know when the SA's need to be refreshed. Daemon 416 will also keep track of any P1 SAs that have expired.

Management process 420 is a daemon that controls creation and deletion of tunnels. When an action is initiated through user interface 406, management process 420 determines if a new tunnel is needed. If so, management process 420 creates a user request 418 and sends it to daemon 416.

Additionally, management process 420 will receive the SA's built by daemon 416 for phase 1 and phase 2 tunnels, and process errors if daemon 416 is not successful. Management process 420 will create tunnels by passing a tunnel context down to IPSEC and generating the associated filter rules for use in filter table 426. IPSEC includes filter interface 428 and tunnel interface 432. More details of the interaction with filter interface 428 and tunnel interface 432 are described in FIG. 5 below. In generating the filter rules, management process 420 will determine the granularity of the new filter rules and determine the proper location in the dynamic filter table for the new rules in accordance with a preferred embodiment of the present invention. Management process 420 will manage phase 1 and phase 2 refreshes, keeping track of when tunnels need to be refreshed if lifetime is set in seconds, or respond to security association (SA) refresh requests from the daemon (for phase 1 refreshes) or kernel (for phase 2 refreshes).

Filter interface 428 is the interface management process 420 calls for loading filter table 426. Filter table 426 is constructed in memory in user space, then the entire table is loaded into kernel 404. The filter rules located in filter table 426 describe the type of traffic that will be using this particular tunnel. These rules include information such as, for example, source and destination addresses and masks, protocol and port numbers, direction, and fragmentation options. When packets are flowing in or out of the system, the packet characteristics are compared to the rules in filter table 426, and a decision is made to either allow, deny or encapsulate/decapsulate a packet from IP stack 430.

Tunnel interface 432 is where the specific security information for the tunnel is stored. Tunnel interface 432 contains information such as encryption algorithm, encryption keys, key lifetimes, transform type (AH or ESP), encapsulation mode. When management process 420 receives an indication from daemon 416 that a phase 2 security association has been created, management process 420 calls the tunnel interface 432 to add an entry to tunnel cache 434 for the new tunnel.

When a rule in filter table 426 indicates that a packet needs to be encapsulated or decapsulated, the information in tunnel cache 434 is used to determine how the encapsulation or decapsulation should be performed.

The crypto modules 436 are the kernel modules that perform the authentication or encryption functions on a packet of data. For authentication, a packet is passed to the crypto routine and a "digest" is calculated. For the encryption option, the packet is passed to the encryption routine, and a packet is returned that contains the cipher text, plus any necessary padding. In the case of decapsulation, the opposite operation is done. For authentication, the digest is calculated and compared with the digest that was provided by the sender. In decapsulation, the packet contains cipher text and is decrypted to recover the original text. A security tunnel may be formed by a filter table, a tunnel cache, and by crypto modules.

In the depicted examples, a UDP packet 438 identifying port 500 is received in IP stack 430. This UPD packet is a packet used for negotiating a tunnel between the computer on which by ISKAMP function 400 is located and another device or computer. The packet is passed to filter table 426, which includes a static rule to allow this packet to be passed on to network input 422. In turn, management process 420 will select rules for use in filtering data for the tunnel using the processes of the present invention. Reponses by daemon 416 to the negotiations are send as UDP packets, such as UDP packet 440 to the target.

Figure 5:
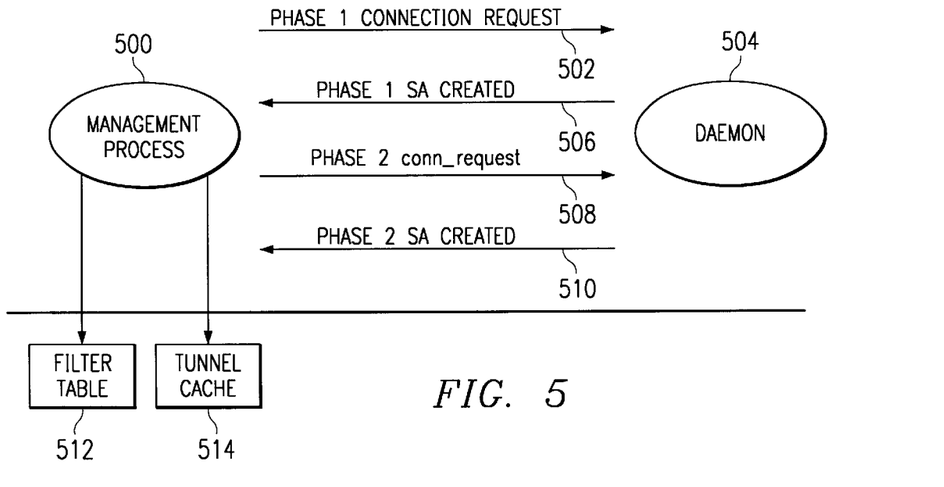
FIG. 5 is a diagram of tunnel activation in accordance with a preferred embodiment of the present invention.

With reference now to FIG. 5, a diagram of tunnel activation is depicted in accordance with a preferred embodiment of the present invention. In FIG. 5, a tunnel is created in which management process 500 sends a request 502 to daemon 504 for a connection. Request 502 is a phase 1 connection request in this example. Management process 500 is a process such as management process 420 in FIG. 4 while daemon 504 is a daemon such as daemon 416 in FIG. 4. Daemon 504 returns a response 506 indicating that a phase 1 SA has been created. In turn, management process 500 sends a phase 2 connection request 508. A response 510 is returned to management process 500 by daemon 504 in which response 510 indicates that a phase 2 SA has been created.

Thereafter, management process 500 determines the granularity of the connection and creates tunnel filter rules based on the determined granularity. Thereafter, filter rules are inserted into filter table 512 and tunnel cache 514 are updated. Filter table 512 and tunnel cache 514 are, for example, filter table 426 and tunnel cache 424 in FIG. 4. Filter table 512 contains rules, which are ordered from more specific or increased granularity to less specific or decrease granularity such that traffic will be compared to a more specific rule for processing before being compared to a more general rule.

Figure 6:
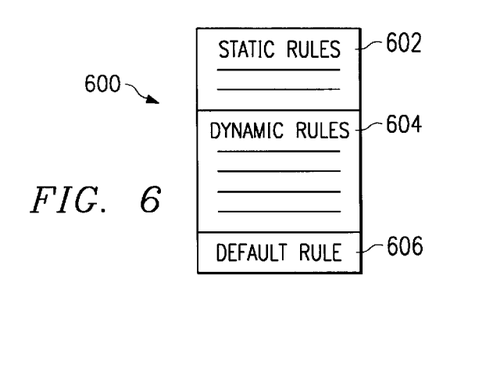
FIG. 6 is a diagram illustrating a filter table in accordance with a preferred embodiment of the present invention.

Turning next to FIG. 6, a diagram illustrating a filter table is depicted in accordance with a preferred embodiment of the present invention. Filter table 600 is an example of a filter table, such as filter table 426 in FIG. 4. In the depicted example, filter table 600 includes static rules 602, dynamic rules 604, and default rule 606. The dynamic rules generated by management processes are dynamic rules, which may be inserted within dynamic rules 604 in filter table 600. Default rule 606 is used if none of the rules in static rules 602 or dynamic rules 604 match a particular tunnel. The rules are arranged such that more specific rules are checked before more general rules. As arranged in FIG. 6, static rules 602 would be checked before dynamic rules 604 for matches with a tunnel. Additionally, within each section the rules are also arranged such that more specific rules within a section in filter table 600 are checked before less specific rules.

For example, a port number and protocol rule would be more specific than a subnet based rule. Thus, if a packet could match both the port number and protocol rule and the subnet based rule, the port number and protocol number would be checked first to see if that rule could be applied to the packet. As a result, in this example, the subnet based rule would not be used to process data packets for the tunnel. The present invention provides a mechanism to generate a rule and automatically place the generated rule within filter table 600 in a location that allows for a more specific rule to be applied to a packet instead of a less specific rule when both rules could match or be used on the packet. Although in FIG. 6, static rules 602 are located before dynamic rules 604, static rule 602 could be placed between dynamic rules 604 and default rule 606.

Figure 7:
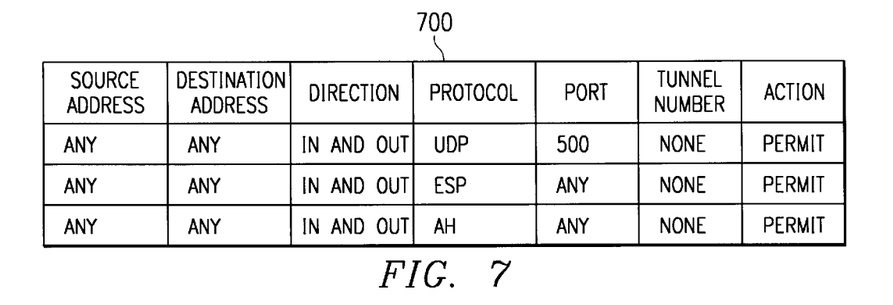
FIG. 7 is a diagram of static rules in a filter table in accordance with a preferred embodiment of the present invention.

Turning next to FIG. 7, a diagram of static rules in a filter table are illustrated in accordance with a preferred embodiment of the present invention. Table 700 provides examples of static filter rules found in filter table 600 in FIG. 6. Each rule in table 700 includes a source address, a destination address, a direction, a protocol, a port number, a tunnel number, and an action. The rules depicted will accept data packets from any source or destination with a protocol of UDP and a port of 500 or a protocol of ESP. The action permits the data packet to be sent to the network input for the daemon.

Figure 8:
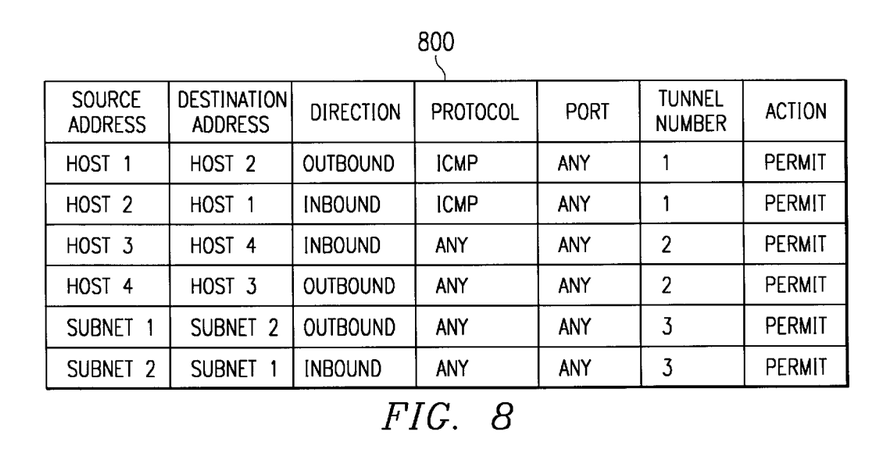
FIG. 8 is a diagram of a dynamic rules in a filter table in accordance with a preferred embodiment of the present invention.

With reference now to FIG. 8, a diagram of a dynamic rules in a filter table is shown in accordance with a preferred embodiment of the present invention. Table 800 provides examples of dynamic filter rules found in filter table 600 in FIG. 6. These rules serve to identify the tunnels that is to process a data packet. Each rule in table 800 includes a destination address, a source address, a direction, a protocol, a port number, a tunnel number, and an action. A default rule (not shown) may be for any source address, destination address, direction, protocol, and port number. No tunnel number is needed for the default rule and the action would be to deny the packet.

Figure 9:
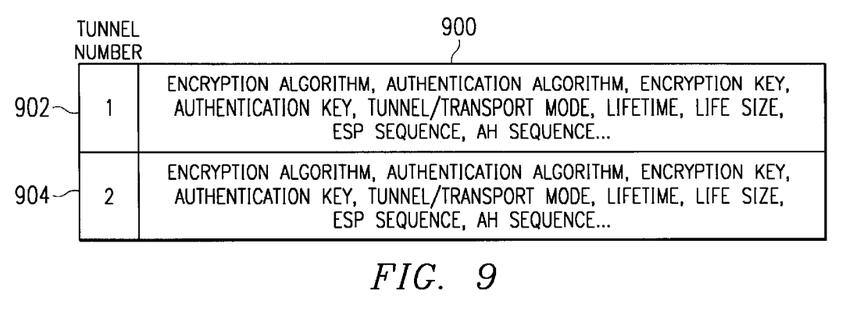
FIG. 9 is a diagram of tunnel cache information in accordance with a preferred embodiment of the present invention.

In FIG. 9, a diagram of tunnel cache information is illustrated in accordance with a preferred embodiment of the present invention. Tunnel cache 900 in the example includes two entries 902 and 904. The tunnel cache entries define how a packet is to be processed. Each entry includes information for processing packets, such as, for example, an encryption algorithm, an authentication algorithm, an encoding key, an authentication key, tunnel/transport mode, life time of the tunnel, life size, ESP sequence, and AH sequence.

Figure 10:
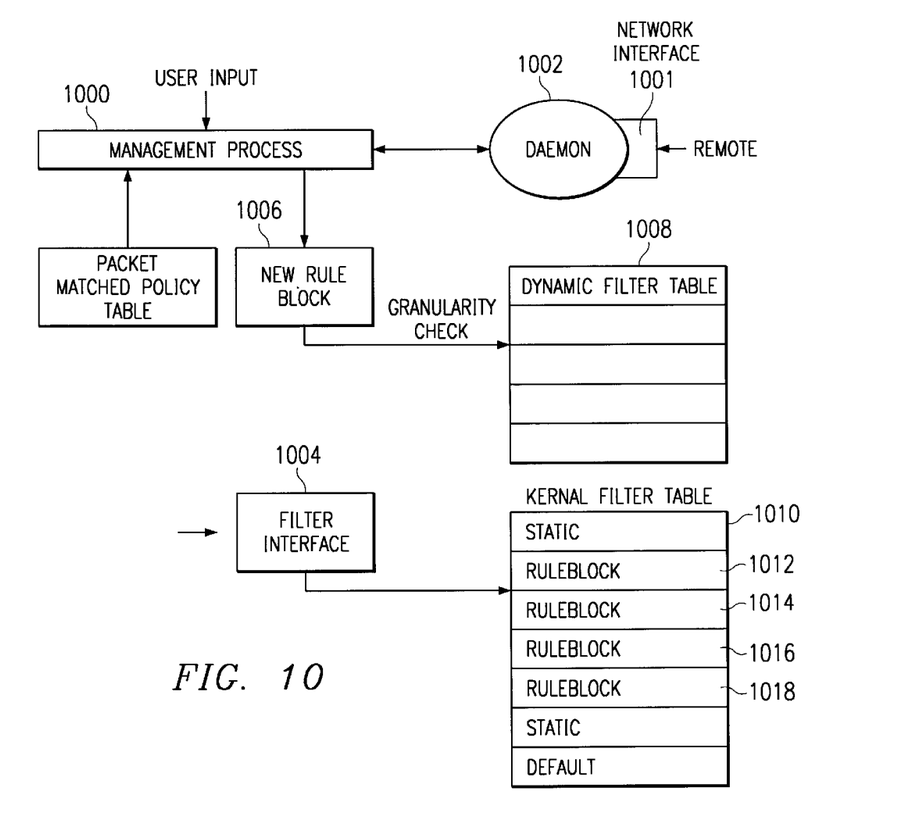
FIG. 10 is a diagram illustrating the addition and removal of a tunnel in accordance with a preferred embodiment of the present invention.

With reference now to FIG. 10, a diagram illustrating the addition and removal of a tunnel is depicted in accordance with a preferred embodiment of the present invention. In this example, management process 1000 may receive user input activating a tunnel. Additionally, a remote initiation of the tunnel may occur through the network using network interface 1001, which is handled by daemon 1002. Management process 1000 may be implemented as management process 420 in FIG. 4 while daemon 1002 may be implemented as daemon 416 in FIG. 4. Further, traffic through filter interface 428 matching a policy for data packets also may cause the addition of a tunnel in this example. In each of these cases, the request to add a tunnel is sent to management process 1000, which identifies a new rule block 1006 from dynamic filter table 1008. New rule block 1006 is placed within filter table 1010. Filter table 1010 is similar to filter table 426 in FIG. 4. In this example, filter table 1010 includes rule blocks 1012, 1014, 1016, and 1018 with each rule block being inserted for a different tunnel.

A tunnel may be removed in these examples under three conditions. A user may send user input to management process 1000 to deactivate the tunnel. Further, the tunnel may expire after a period of time or the remote time may send a request to daemon 1002 from the network to deactivate the tunnel. In such a case, management process 1000 will remove a rule block, such as rule block 1012 from filter table 1010. The removal of this rule block removes the tunnel associated with the removed rule block. Additionally, if the removal of the tunnel is initiated by user input or expiration of a timer, management process 1000 also will send a message to daemon 1002 such that daemon 1002 may remove internal references to the removed tunnel.

Figure 11:
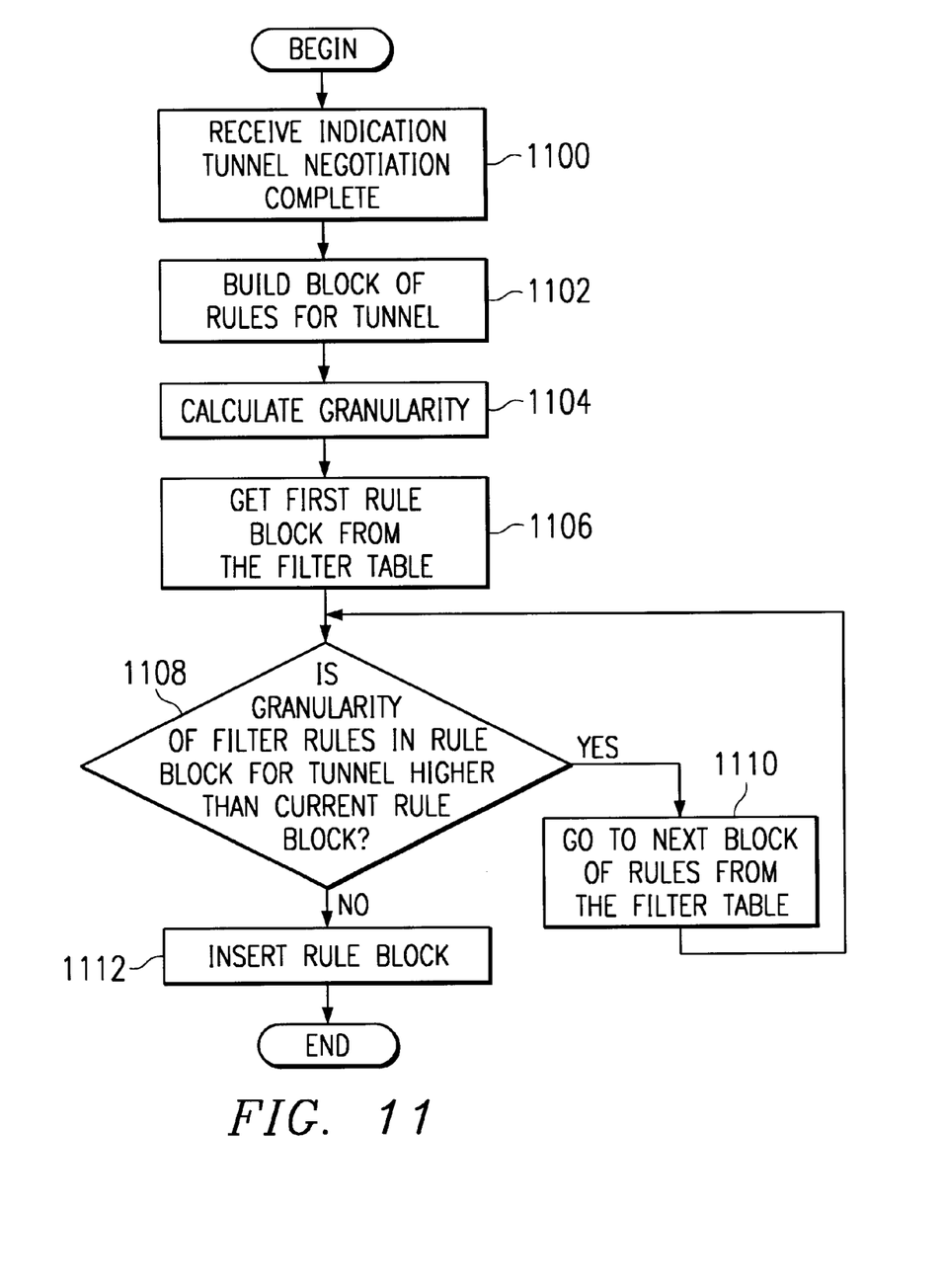
FIG. 11 is a flowchart of a process for generating and inserting rules into a filter table in accordance with a preferred embodiment of the present invention.

With reference now to FIG. 11, a flowchart of a process for generating and inserting rules into a filter table is depicted in accordance with a preferred embodiment of the present invention. In these examples, the rules are generated for an AIX operating system. These processes, however, may be applied for generating and inserting rules for any operating system in which tunnels are used for communication.

The process begins by receiving an indication that tunnel communication has been completed (step 1100). A block of rules are built for the tunnel (step 1102). These rules may be, for example, UDP 500 for negotiation packets, AH for AH packets, and ESP for ESP packets. In particular the block of rules includes an inbound rule for a source address, destination address, protocol, and port. The block of rules also includes an outbound rule for a source address, destination address, protocol, and port.

Thereafter, a granularity is calculated for the tunnel (step 1104). Based on the information available, values are assigned to parameters for the tunnel, such as, for example, identification of a host, a subnet, a port, or a protocol. Any value may be assigned to a parameter. The values are selected such that they are relative to each other and allow for an identification or calculation of the granularity of the tunnel. These values may be for example, host granularity= 100,000, subnet=#bits/32*999, range=(Top of range-bottom of range)/32*999, add port granularity=1000, and add protocol granularity=10,000.

The process then obtains the first block of rules from a kernel filter table (step 1106). This filter table is a filter table, such as filter table 426 in FIG. 4. The filter contains rules used to process data packets for different tunnels.

A determination is made as to whether the granularity calculated for the block of rules is greater than the current block of rules in the filter (step 1108). Each block of rules is assigned a value that is compared with the value calculated with the tunnel. Again, this value is selected to be relative to the desired granularity. If the granularity is greater than the current block of rules, the next block of rules are selected from the table (step 1110) with the process then returning to step 1108. The next block of rules selected will have a lower granularity than the previous one. If the block of rules built for the tunnel does not have a higher granularity than the block of rules in the filter table, this block of rules is inserted into the filter table (step 1112) with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples illustrate creating of rules and ordering of rules for tunnels, the processes of the present invention may be applied to items other than tunnels. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in data processing system for creating and ordering rules that associate network data packets with a particular tunnel definition for security processing, the method comprising the data processing system implemented steps of:

receiving a request to create a tunnel to another data processing system, wherein the request includes an identifier describing network data packets to be processed by the tunnel;

determining a granularity of the identifier found in the tunnel request;

creating a rule based on the identifier to map network data packets to the requested tunnel; and dynamically placing the rule in a set of rules in the data processing system based on an ordering of the rules according to the respective granularity such that rule processing is based on an order of the granularity of the identifier for the rule.

2. A method in data processing system for creating and ordering rules to filter data for a tunnel, the method comprising the data processing system implemented steps of:

receiving a request to create a tunnel to another data processing system;

identifying a granularity of information about the data processing system to form an identified granularity;

selecting a rule matching the identified granularity; and dynamically placing the rule in a set of rules in a filter based on an ordering of the rules according to the respective granularity, wherein the filter associates data packets with the tunnel.

3. The method of claim 2, wherein information identifies a subnet for the another data processing system.

4. The method of claim 2, wherein the information identifies a port number for use in transferring data with the another data processing system.

5. The method of claim 2, wherein the information identifies a protocol for communicating with the another data processing system.

6. The method of claim 2 further comprising:

responsive to a request to remove the tunnel, removing the rule from the filter.

7. The method of claim 2, wherein the filter is a table of rules.

8. The method of claim 2, wherein the filter includes a default rule, which is applied when all other rules within the filter are inapplicable to data being processed by the filter.

9. A computer program product in a computer readable medium comprising:

a filter data structure, wherein the filter data structure includes rules used to associate data with a tunnel, wherein the rules in the filter structure are assigned a specificity and arranged such that rules with more specificity are first applied associated with the data with the tunnel; and a management process, wherein the management process receives a request to establish a tunnel with a target data processing system, creates a rule for the tunnel in response to receiving the request, calculates a specificity for the tunnel based on information about the target data processing system, and dynamically places the rule into a set of rules in the filter structure based on an ordering of the rules according to the respective granularity and on the specificity of the tunnel as compared to specificity of the rules in the filter structure.

10. The computer program product of claim 9 further comprising:

a tunnel cache, wherein the tunnel cache includes information used to process data received for a tunnel.

11. The computer program product of claim 9, wherein the information about the target data processing system is stored in a data structure in the data processing.

12. The computer program product of claim 9, wherein the information about the target data processing system identifies a subnet.

13. The computer program product of claim 9, wherein the information about the target data processing system identifies a port number.

14. The computer program product of claim 9, wherein the information about the target data processing system identifies a protocol.

15. The computer program product of claim 9, wherein the filter structure is a table.

16. The computer program product of claim 9, wherein the filter structure includes static rules, dynamic rules, and default rules.

17. The computer program product of claim 9, wherein the management process automatically removes a rule from the filter structure in response to a tunnel associated with the rule being removed.

18. A data processing system for creating and ordering rules that associate network data packets with a particular tunnel definition for security processing, the data processing system comprising:

receiving means for receiving a request to create a tunnel to another data processing system, wherein the request includes an identifier describing network data packets to be processed by the tunnel;

determining means for determining a granularity of the identifier found in the tunnel request;

creating means for creating a rule based on the identifier to map network data packets to the requested tunnel; and dynamic placing means for dynamically placing the rule in a set of rules in the data processing system based on an ordering of the rules according to the respective granularity such that rule processing is based on an order of the granularity of the identifier for the rule.

19. A data processing system for creating and ordering rules to filter data for a tunnel the data processing system comprising:

receiving means for receiving a request to create a tunnel to another data processing system;

identifying means for identifying a granularity of information about the data processing system to form an identified granularity;

selecting means for selecting a rule matching the identified granularity; and dynamic placing means for dynamically placing the rule in a set of rules in a filter based on an ordering of the rules according to the respective granularity, wherein the filter associates data packets with the tunnel.

20. The data processing system of claim 19, wherein information identifies a subnet for the another data processing system.

21. The data processing system of claim 19, wherein the information identifies a port number for use in transferring data with the another data processing system.

22. The data processing system of claim 19, wherein the information identifies a protocol for communicating with the another data processing system.

23. The data processing system of claim 19 further comprising:

removing means, responsive to a request to remove the tunnel, for removing the rule from the filter.

24. The data processing system of claim 19, wherein the filter is a table of rules.

25. The data processing system of claim 19, wherein the filter includes a default rule, which is applied when all other rules within the filter are inapplicable to data being processed by the filter.

26. A computer program product in a computer readable medium for creating and ordering rules that associate network data packets with a particular tunnel definition for security processing, the computer program product comprising:

- first instructions for receiving a request to create a tunnel to another data processing system, wherein the request includes an identifier describing network data packets to be processed by the tunnel;
- second instructions for determining a granularity of the identifier found in the tunnel request;
- third instructions for creating a rule based on the identifier to map network data packets to the requested tunnel; and
- fourth instructions for dynamically placing the rule in a set of rules in the data processing system based on an ordering of the rules according to the respective granularity such that rule processing is based on an order of the granularity of the identifier for the rule.

27. A computer program product in a computer readable medium for creating and ordering rules to filter data for a tunnel, the computer program product comprising:

- first instructions for receiving a request to create a tunnel to another data processing system;
- second instructions for identifying a granularity of information about the data processing system to form an identified granularity;
- third instructions for selecting a rule matching the identified granularity; and
- fourth instructions for dynamically placing the rule in a set of rules in a filter based on an ordering of the rules according to the respective granularity, wherein the filter associates data packets with the tunnel.

* * * * *